United States Patent [19]

Rao et al.

[11] Patent Number: 4,458,763
[45] Date of Patent: Jul. 10, 1984

[54] SOIL STABILIZER MACHINE WITH RECYCLER SCREEN

[75] Inventors: Prabhakar B. Rao, Enon; Gary L. Jackson, S. Charleston, both of Ohio

[73] Assignee: Koehring Company, Brookfield, Wis.

[21] Appl. No.: 311,265

[22] Filed: Oct. 14, 1981

[51] Int. Cl.³ .............................................. A01B 33/16
[52] U.S. Cl. ...................................... 172/32; 172/112; 241/79.2; 241/86.1; 241/89.1; 404/90
[58] Field of Search ................. 172/32, 112, 119–123; 241/86, 86.1, 89.1–89.4, 79.2; 404/90

[56] References Cited

U.S. PATENT DOCUMENTS

| | | | |
|---|---|---|---|
| 1,660 | 6/1840 | Lukens et al. | 241/86.1 |
| 1,552,750 | 9/1925 | Lain | 172/32 X |
| 2,158,240 | 5/1939 | Mankoff | 241/89.1 |
| 2,368,331 | 1/1945 | Seaman | 172/32 X |
| 2,450,492 | 10/1948 | Stevenson | 241/89.1 |
| 2,618,438 | 11/1952 | Chrystal | 241/86 |
| 2,795,176 | 6/1957 | O'Hara | 172/112 X |
| 3,146,959 | 9/1964 | Putnam, Jr. | 241/86.1 |
| 3,532,169 | 10/1966 | Lely et al. | 172/32 |
| 3,563,191 | 2/1971 | Yovanovich | 172/32 X |
| 3,584,406 | 6/1971 | Kershaw . | |
| 3,746,101 | 7/1973 | Takata | 172/112 |
| 3,907,038 | 9/1975 | Nelson | 172/112 X |
| 3,995,570 | 12/1976 | Lely | 172/123 X |
| 4,005,755 | 1/1977 | Bakke et al. | 172/32 |
| 4,151,883 | 5/1979 | Lely et al. | 172/32 |
| 4,214,633 | 7/1980 | Jackson et al. | 172/123 |

FOREIGN PATENT DOCUMENTS

| | | | |
|---|---|---|---|
| 450071 | 7/1948 | Canada | 404/90 |
| 1557754 | 1/1970 | Fed. Rep. of Germany | 172/112 |
| 2291693 | 6/1976 | France | 172/32 |
| 562230 | 6/1977 | U.S.S.R. | 172/123 |

*Primary Examiner*—Paul E. Shapiro
*Attorney, Agent, or Firm*—Burns, Doane, Swecker & Mathis

[57] ABSTRACT

The present invention relates to a soil stabilizer machine with a recycler screen. The soil stabilizer machine includes a horizontal rotor having a plurality of teeth along a periphery thereof. In operation, the machine moves along the ground and the rotor rotates to dig soil material. The soil dug by the rotor is comminuted by the rotor within a housing surrounding the rotor. Inside the housing and behind the rotor a screen is positioned to selectively permit particles of soil of less than a predetermined size to be dispensed on the ground behind the rotor and to selectively return particles of soil or rock greater than the predetermined size to the rotor to be further comminuted by the rotor. In a preferred embodiment, the screen is pivotably mounted within the housing between first and second positions. The screen can be secured in the first position to return particles of greater than the predetermined size or in the second storage position in which the particles dug up by the rotor are dispensed upon the ground behind the rotor without being sized.

3 Claims, 8 Drawing Figures

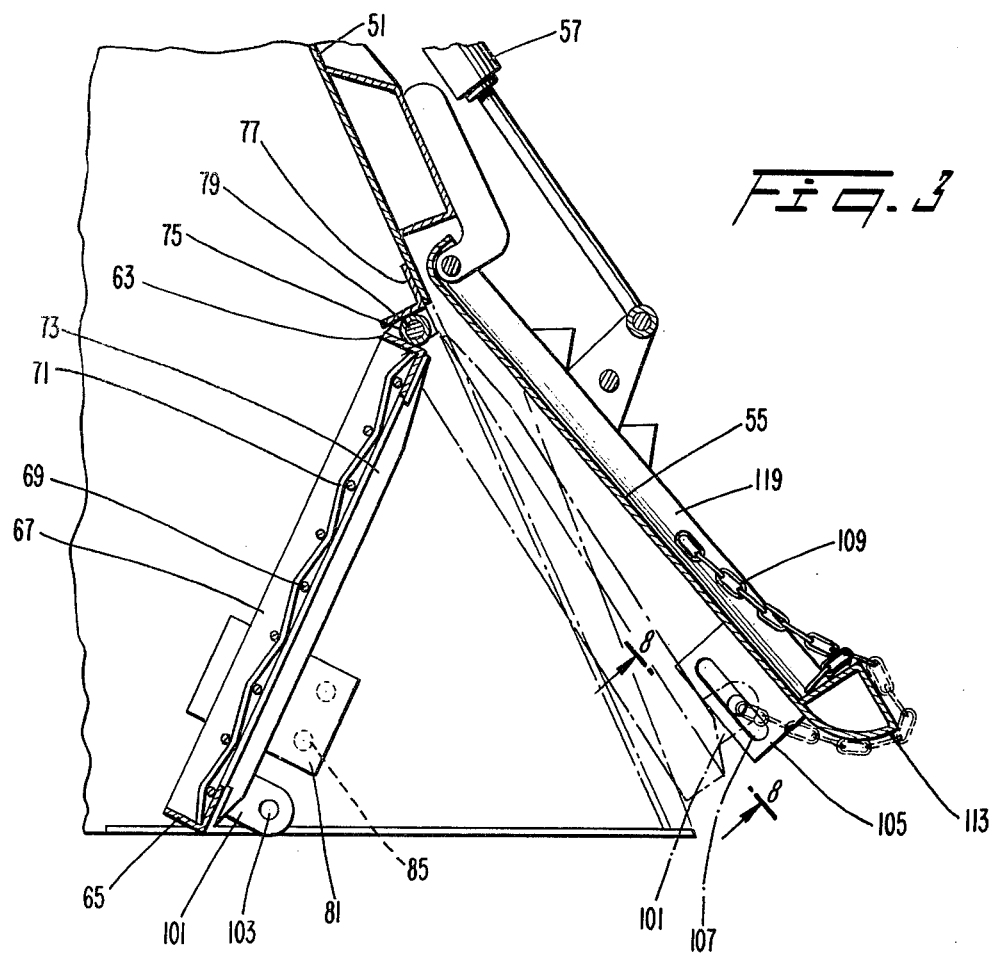
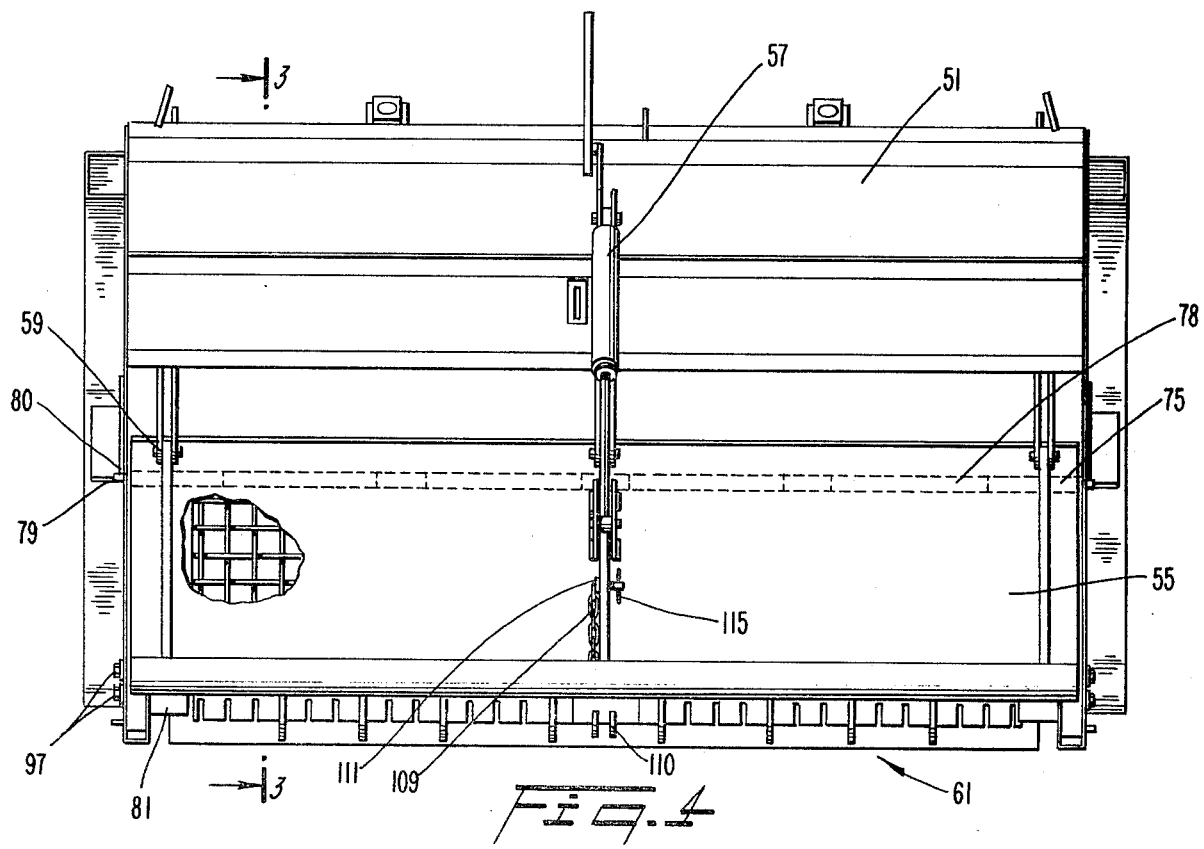

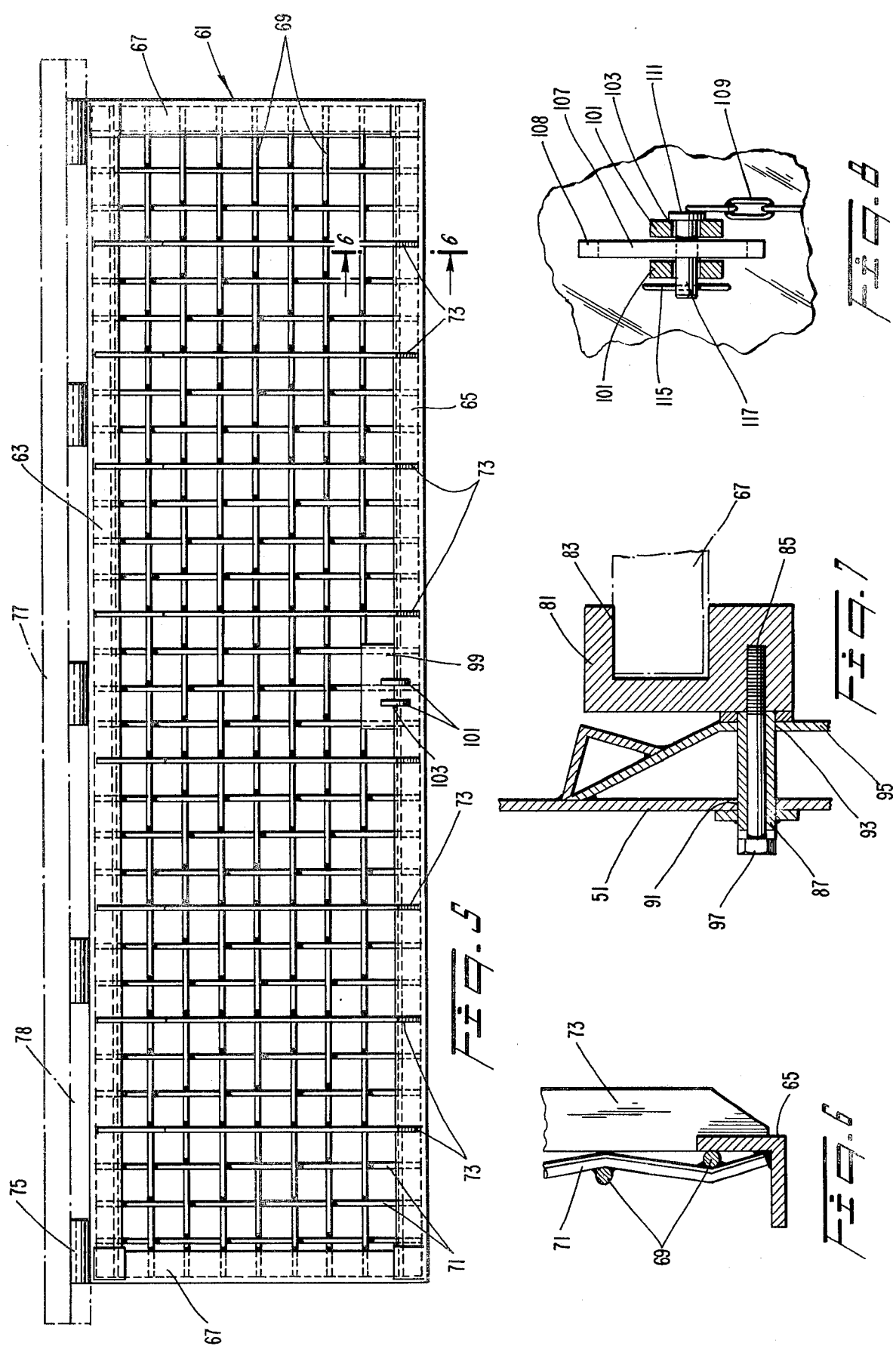

SOIL STABILIZER MACHINE WITH RECYCLER SCREEN

BACKGROUND AND SUMMARY OF THE PRESENT INVENTION

The present invention relates generally to soil stabilizer machines. More particularly, the present invention relates to a soil stabilizer machine with a recycler screen for assuring that the output from the machine is properly sized.

Self propelled soil stabilizer machines which employ a horizontal rotor surrounded by a housing for comminuting and/or mixing soil and other material over which the machine passes are known. The soil stabilizer machine have found wide applications for many purposes. The machine may be used to dig up and comminute old asphalt paving which is reapplied to the ground to form a suitable foundation for subsequent operations. Further, the soil stabilizer machine may be used to blend or mix the soil with suitable additives, such as cement to produce "soil cement" or lime, depending upon the desired use of the processed material.

However, if the ground or material over which the machine passes is heavily packed or contains relatively large rocks, blades arranged on the horizontal rotor do not sufficiently break up the material within the housing in a single pass. For certain applications of a soil stabilizer machine, it is essential that the ground or material be broken up into a sufficiently small particle size for the intended use of the processed ground. In some prior art soil stabilizer machines the only way to obtain a desired particle size was to pass over the same ground numerous times with the soil stabilizer machine. This procedure is particularly time consuming and still does not ensure that the desired particle size will be obtained.

An apparatus has been proposed in an attempt to control the particle size of cultivated soil. A tiltable cutting edge located on a lower surface of a cultivating machine digs up soil and delivers the soil to a chain belt which moves the material in an arcuate path. The chain belt directs material against a grid comprised of a plurality of rods and cross bars which direct material back to a lower portion of the chain belt if the material is to large to pass through the openings in the grid. The motion of the material between the grid and the chain belt causes lumps of earthy material to be broken up into smaller particles that will pass through the openings in the grid. Eventually, the area between the chain belt and the grid becomes filled with large rocks which cannot be broken up and accordingly the machine must be stopped so that the area may be emptied. A device of this general type is disclosed in U.S. Pat. No. 4,005,755 issued Feb. 1, 1977 to Bakke et al.

A further earth preparing apparatus for separating rocks from soil includes a rotatable tilling apparatus for digging into the earth in essentially a plurality of furrows. Quantities of earth are thrown backward relative to the direction of motion of the apparatus against a screen. The screen is inclined away from the rotatable tilling apparatus such that small particles of soil pass through the screen while rocks and clumps of earth which are to large to pass through the screen drop into one of the furrows or channels which have been created by the rotary tilling apparatus. These rocks and large clumps of earth are subsequently covered by soil which passes through the screen. In other words, a device of this type merely places a layer of fine soil on top of the rocks and large clumps which were present initially. A device of this general type is disclosed in U.S. Pat. No. 3,563,191 issued Feb. 16, 1971 to Yovanovich.

Other soil stabilizing or cultivating apparatus are disclosed in U.S. Pat. Nos. 3,532,169 issued Oct. 6, 1970 to van der Lely; 3,584,406 issued June 15, 1971 to Kershaw; 3,995,570 issued Dec. 7, 1976 to van der Lely; 4,151,883 issued May 1, 1979 to van der Lely et al; and 4,214,633 issued July 29, 1980 to Jackson et al. None of these patents discloses an apparatus for recycling large particles of materials dug up by a soil cultivator or for assuring that a uniform particle size of the output is obtained.

Various objects and advantages will be evident to those of ordinary skill from the following description of a preferred embodiment of a soil stabilizer machine according to the present invention. A soil working or stabilizer machine according to the present invention includes a generally cylindrical rotor having a plurality of teeth arranged along the cylindrical surface of the rotor. The rotor is driven by a suitable motor about a horizontal axis for digging and for comminuting or pulverizing soil. A housing surrounds the rotor for confining the soil dug by the rotor for comminution or mixing by the rotor. According to the present invention, a recycler screen is provided behind the rotor with respect to the direction of travel of the soil working machine. The recycler screen selectively permits particles of soil of less than a predetermined size to be dispensed onto the ground behind the rotor and selectively returns particles of soil or rock greater than the predetermined size to the rotor to be further comminuted by the rotor. In the preferred embodiment, the screen is arranged at a rear of the housing generally parallel to the rotor axis such that a lower edge of the screen is arranged closer to the periphery of the rotor than an upper edge of the screen. This arrangement ensures that the particles which do not pass through the screen will be directed back toward the rotor to be broken into smaller particles within the housing.

Further, according to the preferred embodiment, the screen is pivotably mounted about an upper edge of the screen for movement between a first position for sizing the particles and a second, storage position. In the storage position, the screen does not interfere with the dispensing of soil onto the ground behind the rotor. The screen preferably comprises a rigid generally rectangular frame having a plurality of horizontal and vertical rod members secured to the frame and woven together to form openings of a predetermined size through which particles of material must pass. A plurality of vertical reinforcing members arranged on a side of the screen remote from the rotor are provided to reinforce the rods of the screen to limit bending of the rods caused by rocks and material hurled at the screen during machine operation. Still further, suitable arrangements for securely fastening the screen in the first and second positions are provided.

The present invention provides a simple and effective apparatus for ensuring that the particles dispensed behind the rotor are properly sized for the particular purpose for the processed material. In addition, the present invention provides a screen which can be readily moved to a storage position so that particles of any size may be dispensed behind the rotor.

BRIEF DESCRIPTION OF THE DRAWINGS

A preferred embodiment of the present invention will be described in greater detail with reference to the accompanying drawings, wherein like members bear like reference numerals and wherein:

FIG. 3 is an enlarged cross-sectional view of a portion of the soil stabilizer machine taken along the line 3—3 of FIG. 4 showing the recycler screen according to the present invention in greater detail;

FIG. 4 is a rear view of the portion of the soil stabilizer machine of FIG. 2 with portions cut away;

FIG. 5 is a plan view of the recycler screen removed from the soil stabilizer machine;

FIG. 6 is a detail view of a portion of the recycler screen taken along the line 6—6 of FIG. 5;

FIG. 7 is a detail view of a portion of the soil stabilizer machine taken along the line 7—7 of FIG. 2 to illustrate the fasteners used for holding the recycler screen in an operative position; and FIG. 8 is a detail view of a portion of the soil stabilizer machine taken along the line 8—8 in FIG. 3.

DETAILED DESCRIPTION OF THE PREFERRED EMBODIMENT

Figure 1:
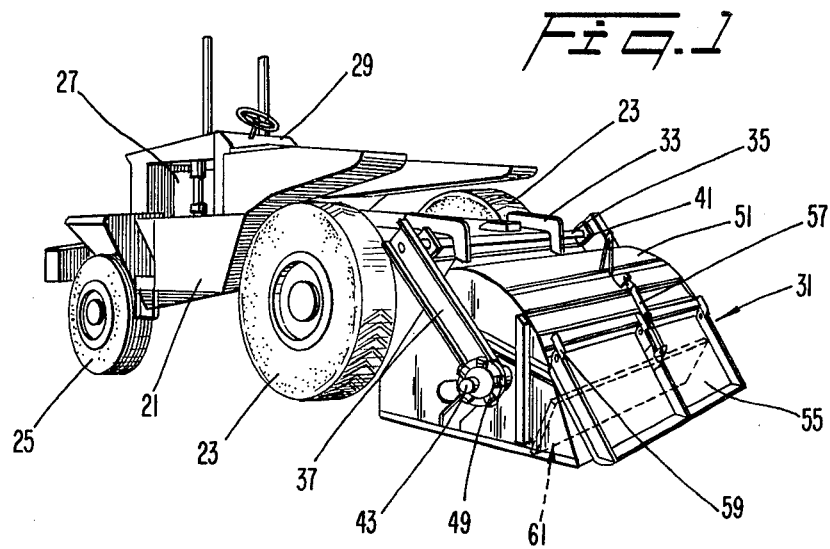
FIG. 1 is a perspective view of a soil stabilizer machine with a recycler screen according to the present invention shown in phantom lines.

The present invention may be used with a wide variety of soil stabilizer or cultivating machines of various different configurations. One such soil stabilizer machine is disclosed in U.S. Pat. No. 3,795,279 issued May 5, 1974 to Nelson which patent is hereby incorporated by reference. By way of illustration, and not intended to limit the present invention, one soil stabilizer machine with which a recycler screen of the present invention can be used will be described with reference to FIG. 1. The machine includes a main frame or chassis 21 having two preferably rubber tired rear traction wheels 23 and two preferably rubber tired steerable front wheels 25. An internal combustion engine or other suitable power plant 27 and an operator control console 29 are mounted on the chassis 21. A soil stabilizer unit 31 is located at the rear of the chassis 21 and is connected thereto by a draw bar 33.

The stabilizer unit 31 includes a horizontally disposed cross tube 35 which is rigidly connected to a pair of spaced apart rearwardly extending lifting arms 37 between which a horizontally disposed rotatable rotor 39 is mounted. The cross tube 35 is rotatably supported on a support 41 which is secured to the chassis 21.

Figure 2:
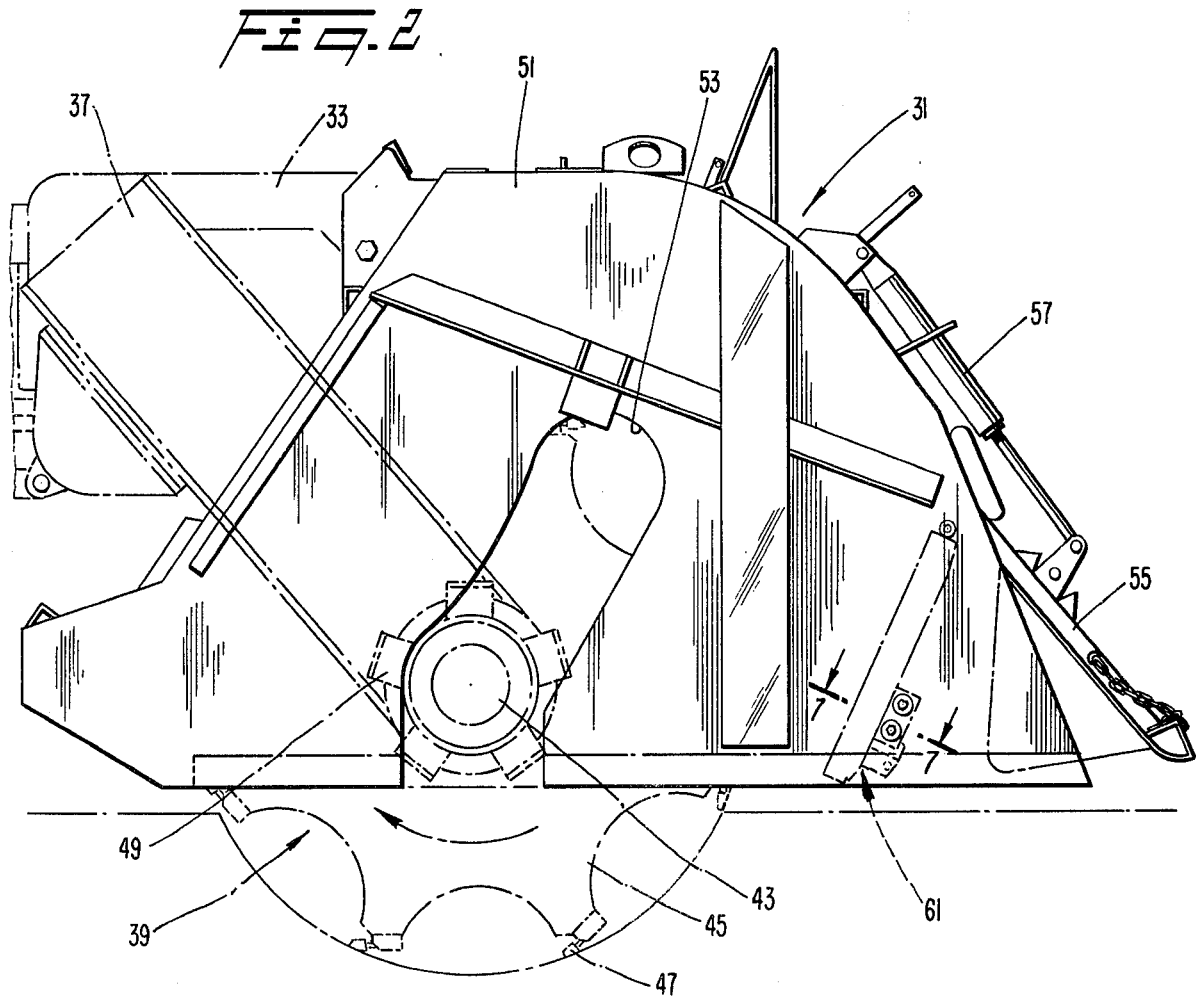
FIG. 2 is an enlarged side view of a left side portion of the soil stabilizer machine of FIG. 1.

With reference to FIG. 2, the rotor 39 includes a shaft 43 upon which a plurality of tine plates 45 (only one of which is shown) are rigidly mounted. Each tine plate 45 is provided with a plurality of replacable tines 47 equiangularly spaced along the outer periphery of the tine plates 45. The rotor 39 is adapted to be rotated, for example, by low speed hydraulic motors 49 rigidly mounted on the lifing arms 37. The motor output shafts are connected directly to the ends of the rotor shaft 43. It will be understood that the rotor 39 may also be driven by electric motors through drive chains or any other drive rotating mechanism.

A mixing box or rotor housing 51 is supported on the draw bar 33 and surrounds the rotor 39. The housing 51 is generally frustro-conical in cross-section and may be equipped to receive various additives to be blended or mixed with the comminuted soil. During operation, housing 51 serves to contain the soil or material displaced by the rotor so that the material can be comminuted and/or mixed by the action of the rotor 39. Each side of the housing 51 includes a clearance slot 53 to afford clearance for the rotor 39 to be raised and lowered by, e.g., a pair of hydraulic actuators (not shown) which have one end connected to the chassis 21 and the other end secured to the lifting arms 37 in a conventional manner. The rotor 39 is raised or lowered within the clearance slots 53 to obtain the desired depth of cut of the rotor 39. The housing 51 is also provided with a tailgate 55 which is positionable by an hydraulic cylinder 57 to ensure an even strike off at the desired elevation of the soil processed by the rotor 39. The tailgate 55 is pivotable about suitable hinging arrangements 59 on either side of the tailgate 55.

According to the present invention, a recycler screen 61 (shown in phantom lines in FIG. 1) is arranged within a rear portion of the housing 51 behind the rotor 39 in relation to the direction of travel of the stabilizer unit 31. It should be noted that if the soil stabilizer unit 31 is adapted to work soil in either direction of travel, a second recycler screen can be arranged near a forward end of the housing 51. The recycler screen 61 is arranged generally parallel with the rotor shaft 43 at a location such that the tines 47 will clear the recycler screen 61 in any location of the rotor shaft 43 within the clearance slots 53 in the housing 51 (FIG. 2).

The screen 61 is arranged with a lower edge of the screen being closer to the periphery of the rotor 39 than an upper edge of the screen 61. By this arrangement, it is assured that large particles of material or rocks which are unable to pass through the screen 61 are deflected back into the path of the rotor 39 to be further comminuted or pulverized within the housing 51. The screen 61 is arranged at an angle such that the plane of the screen is generally tangent to the rotor cutting circle. In other words, the angle of the screen 61 is arranged such that deflected particles will be directed back toward the periphery of the rotor 39 rather than downwardly toward ground immediately behind the rotor periphery. In this way, large deflected particles are carried along by the rotor 39 and comminuted within the housing 51 before being dispensed on the ground behind the rotor 39. Further, since the screen 61 is generally tangent to the cutting circle, large particles do not drop near the lower edge of the screen 61 without being impacted by the rotor 39.

With reference to FIG. 5, the screen 61 includes a generally rectangular frame having an upper horizontal member 63, a lower horizontal member 65 and two parallel vertical side members 67. Each of the members comprising the frame are preferably made from elongated sections of angle iron. As best seen in FIG. 4, the screen 61 extends substantially the entire width of the housing 51 so that material dug by the rotor 39 cannot be dispensed behind the rotor 39 without passing through the screen 61. Secured to the side frame members 67 are a plurality of horizontal rod members 69 while a plurality of vertical rod members 71 have ends secured to the upper frame member 63 and the lower frame members 65.

The horizontal rod members 69 and the vertical rod members 71 are arranged in a woven pattern to form a plurality of openings of a predetermined size. The woven pattern also helps improve the stability of the entire screen assembly (FIG. 3). The rod members are preferably made of a suitable steel. The ends of the horizontal and vertical rod members are secured to a side of the frame members facing the rotor by any suitable connection, for example, by welding. By securing the rod members to the frame side facing the rotor 39, particles directed at the screen 61 will not tend to break the rod members away from the frame members.

A plurality of spaced apart vertical stiffener ribs 73 are preferably provided along respective vertical rod members at evenly spaced intervals. In the illustrated embodiment, the stiffener ribs 73 are provided along approximately every third vertical rod member 71 to further stiffen the screen assembly against impacts from large particles and to further increase the strength of the assembly. The vertical rod members 71 are preferably welded to the corresponding stiffening rib 73 at each point at which the rod members 71 contact the ribs (FIG. 6).

With reference to FIG. 5, secured by any suitable connection, for example, welding to an upper surface of the upper frame member angle iron 63 are a plurality of spaced apart tube sections 75. An angle iron 77 is secured to the inside of the housing 51 above or closely adjacent to the upper opening of the tailgate 55 (FIG. 3). The angle iron 77 extends substantially the entire width of the housing 51. Secured to the angle iron 77 are a plurality of spaced apart tube sections 78 having generally the same diameter as the tube sections 75 secured to the screen 61. The tube sections 78 are adapted to fit in the spaces between the tube section 75 on the screen 61.

When it is desired to place the screen within the housing 51, the screen is positioned within the housing with the tube sections 75 and the tube sections 78 on the angle iron 77 aligned with one another. A rod 79 is then passed through suitable openings in the sides of the housing 51 and through the openings in the tube sections to provide a pivotable mounting for the screen 61. The rod or hinge pin 79 is secured in position by any suitable arrangement, for example, by passing a pin 80 through an opening provided adjacent each end of the rod 79. It should also be noted that by removing the rod or hinge pin 79, the screen 61 may be readily removed. In this way, another screen having a different predetermined opening size between the horizontal and vertical members may be installed if desired.

In order to secure the screen 61 in the desired location as described above with the lower end of the screen closer to the rotor 39, a bracket 81 (FIG. 7) includes an opening 83 therein adapted to receive the frame side member 67. The bracket is arranged on the side member 67 near the lower edge of the frame. The bracket 81 may be permanently secured to the side member 67 or may be easily removable to facilitate pivotable movement of the screen 61 without undue friction being generated between the bracket 81 and the inside of the housing 51. Also, by removably mounting the bracket 81, it is possible to use different brackets when it is desired to change the height of the lower edge of the frame for different strike off levels of the ground.

A threaded opening 85 is provided in the side opposite the opening 83 in the bracket 81. A sleeve member 87 is adapted to pass through openings 91 in the housing 51 which openings are adapted to align with the openings 85 in the bracket 81. If the housing 51 includes a double wall construction, a suitable opening 93 for the sleeve 87 must be provided in an interior wall 95 of the housing. After arranging the side member 67 within the opening 83, a bolt 97 is received in the sleeve and threaded into the bore 85 in the bracket 81 to securely hold the screen 61 in the desired location. It should be noted that the illustrated embodiment includes two bolts passing through each side of the housing 51 for securing the screen 61. However, any number of bolts which is deemed sufficient may be provided.

Since the screen 61 is pivotably mounted about the axis of the pin 79, it is possible to pivot the screen to a second, inoperative or storage position closely adjacent to the tailgate 55. In such a position, the screen 61 is substantially clear of the material dug up by the rotor 39 and tossed toward the rear of the housing 51. Such a position may be desirable when the ground material being worked is of sufficiently fine quality that large chunks of material or rocks are not present and therefore recycling the material is not necessary.

The present invention also provides an arrangement for securing the screen 61 in the second storage position. The arrangement includes a plate member 99 secured to the lower frame member 65 preferably by welding. A pair of spaced apart flanges 101 extending generally perpendicular to the plane of the screen 61 are rigidly secured to the plate member 99. Each of the flanges 101 includes an opening 103 which openings are aligned with one another. A further flange 105 (FIG. 3) is secured to the inside surface of the tailgate 55. The flange 105 is adapted to be received between the flanges 101 on the screen 61 when the screen is placed in the second, storage position. In the second position, an elongated slot 107 in the flange 105 is aligned with the openings 103.

On the outside of the tailgate 55, a first end of a flexible member 109 is secured to a reinforcing flange 119 by any suitable securement apparatus. For example, the flexible member may be a chain and the securement may include welding a first end of the flexible member or chain 109 to the reinforcing flange 119. A second end of the flexible member or chain 109 has a cotter pin 111 secured thereto, for example, by welding. In order to secure the screen in the second position generally parallel with the tailgate 55 (shown in phantom lines in FIG. 3), the chain 109 is passed beneath the lower edge 113 of the tailgate 55 and the cotter pin 111 is passed sucessively through the opening 103 in one of the flanges 101, the slot 107 in the flange 105, and the opening 103 in the other flange 101. A retaining pin 115 is then passed through an opening 117 in the end of the cotter pin 111 opposite the end to which the chain 109 is secured. In this way, the screen member is held securely in the second inoperative position by the flexible member 109.

It should be noted, that the simple cotter pin arrangement disclosed herein is sufficiently strong to hold the screen 61 in the second position since the screen is not subjected to as much impact stress as when the screen 61 is in the first position. The additional bolts and more positive securing arrangement as described previously is desirable in the first position but is not essential in the second position. When the screen 61 is in the operative position, the chain 109 can be conveniently stored by providing an opening in the tailgate reinforcing flange 119. The cotter pin 111 can then be passed through the opening and retained by placing the retaining pin 115 through the cotter pin opening 117 (FIG. 4).

In operation, the stabilizer machine moves forward along the ground and the rotor 39 is driven by the motor 49 to dig the material or soil over which the unit 31 passes. The material dug by the rotor 39 is comminuted to an extent within the housing 51 and is flung backwardly toward the rear of the housing 51. With the screen 61 according to the present invention secured in the first, operative position, particles of material which are to large to pass through the openings between the horizontal rods 69 and the vertical rods 71 are directed or deflected back toward the rotor 39. The deflected particles are subjected to the action of the rotor 39 to be further comminuted within the housing 51. This deflection cycle continues until the particles of material are small enough to pass through the openings in the screen.

If the material being stabilized is sufficiently fine or the size of the dispensed particles is not as critical, the bolts 97 can be easily loosened and removed and the screen 61 can be pivoted about the rod member 79 into the inoperative position adjacent the tailgate 55. The chain 109 is then released from the reinforcing flange 119 and the cotter pin 111 is passed through the openings in the flanges 101 and the flange 105. The retaining pin 115 is inserted in the cotter pin 111 to secure the screen 61 in the storage position. The storage position is also useful when transporting the stabilizer machine.

The principles, preferred embodiment and mode of operation of the present invention have been described in the foregoing specification. However, the invention which is intended to be protected is not to be construed as limited to the particular embodiment disclosed. The embodiment is to be regarded as illustrative rather than restrictive. Variations and changes may be made by other without departing from the spirit of the present invention. Accordingly, it is expressly intended that all such variations and changes which fall within the spirit and scope of the present invention as defined in the appended claims be embraced thereby.

What is claimed is:

1. In a soil stabilizer machine comprising:
a rotor having a plurality of teeth and being rotatable about a horizontal axis;
means for driving the rotor to dig and to comminute soil and means for advancing the soil stabilizer machine in a direction generally perpendicular to the horizontal axis; and
a housing surrounding the rotor for containing soil dug by the rotor to permit comminution of the soil by the rotor, the improvement comprising:
a screen arranged at a rear end of said housing, the screen being adapted for selectively permitting particles of soil of less than a predetermined size to be dispensed onto the ground behind the rotor with regard to the machine direction and for selectively returning particles of soil or rock greater than said predetermined size to the rotor to be further comminuted within the housing by the rotor, the screen having a lower edge arranged closer to the periphery of the rotor than an upper edge of the screen, a plane of the screen being generally parallel to the axis of the rotor; and
the screen comprises
a rigid, generally rectangular frame;
a plurality of horizontal and vertical rod members woven together to form openings of the predetermined size through which the particles must pass, the horizontal and vertical members being secured at ends of the members to the frame; and
a plurality of vertical reinforcing members arranged on a side of the screen remote from the rotor, each reinforcing member being aligned with a corresponding one of the vertical rod members, said corresponding vertical rod members being secured to the corresponding reinforcing members.

2. In a soil stabilizer machine comprising:
a rotor having a plurality of teeth and being rotatable about a horizontal axis;
means for driving the rotor to dig and to comminute soil and means for advancing the soil stabilizer machine in a direction generally perpendicular to the horizontal axis; and
a housing surrounding the rotor for containing soil dug by the rotor to permit comminution of the soil by the rotor, the improvement comprising:
a screen arranged of a rear end of said housing, the screen being adapted for selectively permitting particles of soil of less than a predetermined size to be dispensed onto the ground behind the rotor with regard to the machine direction and for selectively returning particles of soil or rock greater than said predetermined size to the rotor to be further comminuted within the housing by the rotor, and said screen having a lower edge arranged closer to the periphery of the rotor than an upper edge of the screen;
the screen being pivotably mounted about the upper edge of the screen for movement between a first position and a second position, the first position being at the rear of the housing with the lower edge arranged closer to the periphery of the rotor than the upper edge of the screen, and the second position being at a location such that all of the particles of soil are dispensed onto the ground behind the rotor;
first means for selectively securing said screen in the first position, and second means for selectively securing said screen in the second position;
the first means comprising at least one bolt passing through each side of the housing and engaging a threaded opening in a bracket arranged on the side of the screen for securing the screen in the first position.

3. In a soil stabilizer machine comprising:
a rotor having a plurality of teeth and being rotatable about a horizontal axis;
means for driving the rotor to dig and to comminute soil and means for advancing the soil stabilizer machine in a direction generally perpendicular to the horizontal axis; and
a housing surrounding the rotor for containing soil dug by the rotor to permit comminution of the soil by the rotor; the improvement comprising:
a screen arranged of a rear end of said housing, the screen being adapted for selectively permitting particles of soil of less than a predetermined size to be dispensed onto the ground behind the rotor with regard to the machine direction and for selectively returning particles of soil or rock greater than said predetermined size to the rotor to be further comminuted within the housing by the rotor, and said screen having a lower edge arranged closer to the periphery of the rotor than an upper edge of the screen;
the screen being pivotably mounted about the upper edge of the screen for movement between a first position and a second position, the first position being at the rear of the housing with the lower edge arranged closer to the periphery of the rotor than the upper edge of the screen, and the second position being at a location such that all of the particles of soil are dispensed onto the ground behind the rotor;

first means for selectively securing said screen in the first position, and second means for selectively securing said screen in the second position; the second means comprising a pair of flanges secured to the screen, each flange having a bore therethrough, a flange secured to an interior of the housing and having a bore therethrough, said flange being adapted to pass between said pair of flanges such that the bores are substantially aligned in the second position of the screen, and a cotter pin adapted to pass through the aligned bores to secure the screen in said second position.

* * * * *